US008468586B2

(12) United States Patent
Koottayi et al.

(10) Patent No.: US 8,468,586 B2
(45) Date of Patent: Jun. 18, 2013

(54) METHODS AND SYSTEMS FOR IMPLEMENTING POLICY BASED TRUST MANAGEMENT

(75) Inventors: Vipin Koottayi, Trikarpur (IN); Rohit Koul, Jammu (IN); Madhu Martin, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 423 days.

(21) Appl. No.: 12/611,448

(22) Filed: Nov. 3, 2009

(65) Prior Publication Data
US 2011/0107089 A1    May 5, 2011

(51) Int. Cl.
*G06F 17/30* (2006.01)
(52) U.S. Cl.
USPC ............................................................ 726/8
(58) Field of Classification Search
None
See application file for complete search history.

(56) References Cited

U.S. PATENT DOCUMENTS
2009/0271842 A1 * 10/2009 Baumhof ......................... 726/1

* cited by examiner

*Primary Examiner* — Brandon Hoffman
(74) *Attorney, Agent, or Firm* — Kilpatrick Townsend & Stockton LLP (57) ABSTRACT

This disclosure describes, generally, methods and systems for implementing policy based trust management. The method includes receiving, at an host server, a trust request from a partner, and identifying, at the host server via a trust policy enforcer, parameters and attributes associated with the partner. The method further includes identifying, at the host server via the trust policy enforcer, parameters and attributes associated with the requested resource, and accessing, by the trust policy enforcer, a policy database. Furthermore, the method includes retrieving, by the trust policy enforcer, one or more trust policies associated with the requested resource, and based on the attributes and parameters of the partner, applying, by the trust policy enforcer, the one or more associated trust policies to the request. Further, the method includes based on conformity with the one or more trust policies, providing the partner with access to the requested resource.

18 Claims, 5 Drawing Sheets

METHODS AND SYSTEMS FOR IMPLEMENTING POLICY BASED TRUST MANAGEMENT

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates, in general, to trust management and, more particularly, to policy based trust management.

BACKGROUND

Typically, in trust based scenarios whenever a trust is established between the participating entities, the trust will remain active until an explicit action is taken by one or more of the participating entities to delete or revoke the artifact symbolizing the trust. For example, a trust is established in the form of a secret key which is shared between a server and partner application which uses the server's services. This trust remains until 1) the key is modified, revoked, deleted, etc., or 2) The server administrator explicitly deletes the partner application entry.

The problem with this implementation is that there are situations where an infinite longevity of such a trust is not required (e.g., administration overhead due to too many applications getting registered and not being used after few days), and the login server will have too many apps being registered and some of them will be needed only for a few days, for example. The login server may be an Oracle™ Single Sign-On server. However, the trust will still nonetheless remain until the entry is deleted explicitly, thus, opening the server up to potential security breaches and the like. Hence, improvements are needed in the art.

BRIEF SUMMARY

Embodiments of the present invention are directed to a computer implemented method of implementing policy based trust management. The method includes receiving, at an host server, a trust request from a partner, and identifying, at the host server via a trust policy enforcer, parameters and attributes associated with the partner. The method further includes determining, at the host server via the trust policy enforcer, whether to trust the partner based on attributes and parameters, and accessing, by the trust policy enforcer, a policy database.

For example, the partner may be mail.webpage.com and another partner may be games.webpage.com. Both of these partners have established trust with the webpage.com server. In this scenario the present invention covers the trust established between the mail.webpage.com server and the webpage.com server, as well as games.webpage.com and webpage.com, and so forth.

The present invention further determines whether the established trust is to be honored based on dynamic rules and policies that can be defined. There may be one trusted entity and multiple trusting entities whose trust may or may not be honored by the trusted entity based on the policy. The policy and/or rules may be based on attributes, such as: date (i.e., after a particular date trust is not honored), IP address (i.e., if the trusting entity's IP address changes, the trust will not be honored), HostIdentifier, or relevant attributes.

A data source may be required to capture the policy and some attributes, such as last accessed date, etc. The data source could be a database, LDAP, a flat file, etc. The policies may be fetched from the data source, and if there is a policy like "do not honor the trust if last time trust is established before 'n' days from current date", the last accessed date could be fetched from the data source to evaluate the policy.

Furthermore, the method includes retrieving, by the trust policy enforcer, one or more trust policies associated with the partner, and based on the attributes and parameters of the partner, applying, by the trust policy enforcer, the one or more associated trust policies to the trust request. Further, the method includes based on conformity with the one or more trust policies, providing the partner with access to the host server.

In a further embodiment, a system for implementing policy based trust management. The system includes a trust policy database configured to store a plurality of trust policies, and a partner database configured to store partner account information. The system further includes an host server coupled with the trust policy database and the partner database. The host server includes a trust policy enforcer which is configured to receive a policy request from a partner, and identify parameters and attributes associated with the partner by accessing the partner database. For example, when the trust request comes to the trusted entity (e.g., the host server), the trusted entity uses the dynamic policy attributes and checks if a policy exists to honor the trust. If it resolves to be invalid, then the trusted entity does not include the entity in its trust group. The trust policy enforcer is further configured to identify parameters and attributes associated with the partner, access the policy database and retrieve one or more trust policies associated with the partner. The trust policy enforcer is further configured to, based on the attributes and parameters of the partner, apply the one or more associated trust policies to the request, and based on conformity with the one or more trust policies, provide the partner with access to the host server.

In a further embodiment, mechanism in which the server may run a background process/thread periodically to check if any entries can be discarded, is described. If the expiry date for a partner has lapsed, then the entry can be discarded from the partner database.

In an alternative embodiment, a machine-readable medium implementing policy based trust management, is described. The machine-readable medium includes instructions for receiving a trust request from a partner, and identifying parameters and attributes associated with the partner. The machine-readable medium further includes instructions for identifying parameters and attributes associated with the partner, and accessing a policy database.

Furthermore, the machine-readable medium includes instructions for retrieving one or more trust policies associated with the partner, and based on the attributes and parameters of the partner, applying the one or more associated trust policies to the request. Further, the machine-readable medium includes instructions for based on conformity with the one or more trust policies, providing the partner with access to the host server.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

According to further respects of the present invention, a policy based trust is established between the participating entities. This policy maybe time based (valid for a specific time period), subscription model (payment, premium, free etc), or any other criteria which can be expressed as a policy (i.e., IP based, change in administration information, change in URL, etc.). For example, while registering an application against a Single Sign-On server, the server administrator could choose a policy for the application (e.g., 3 months validity period).

While the existing solutions are to delete the artifacts specifying the trust explicitly, the present invention proposes, in part, an automatic administrator enforced management based on a number of criteria. The present invention takes into account extreme scenarios, such as inactivity for a specified period.

Figure 1:
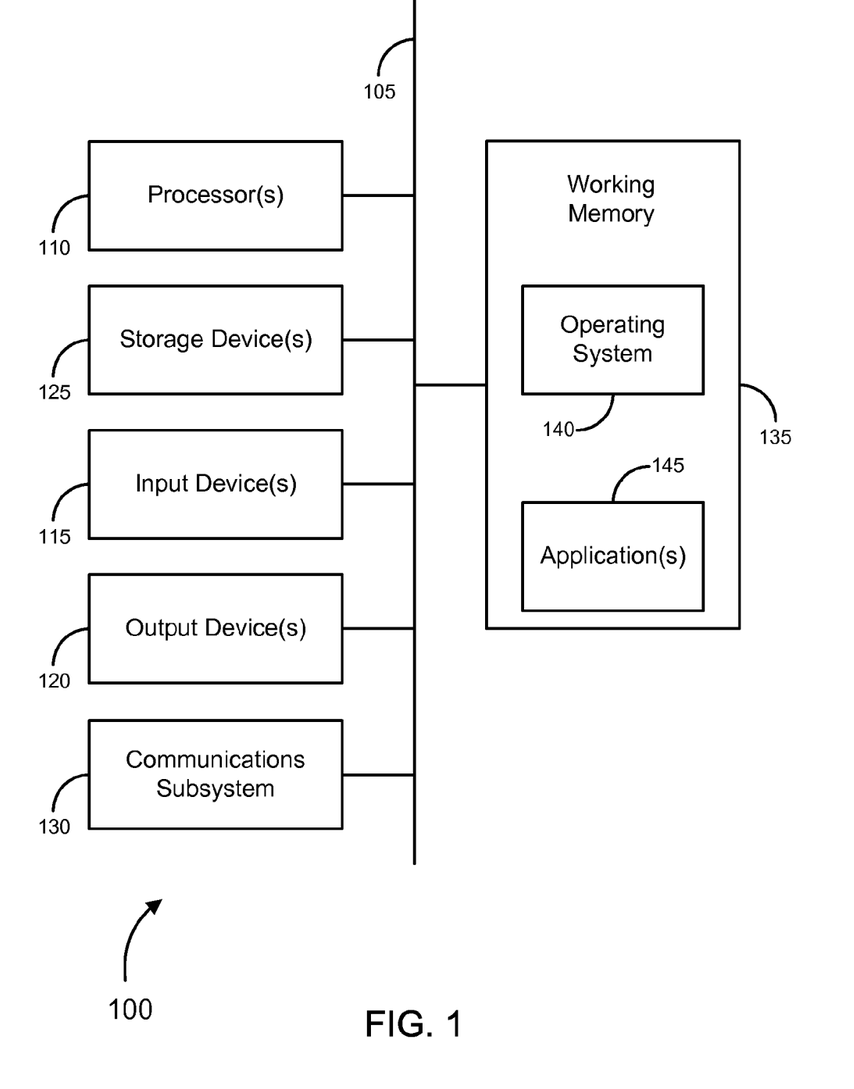
FIG. 1 is a generalized schematic diagram illustrating a computer system, in accordance with various embodiments of the present invention.

FIG. 1 provides a schematic illustration of one embodiment of a computer system 100 that can perform the methods of the invention, as described herein. It should be noted that FIG. 1 is meant only to provide a generalized illustration of various components, any or all of which may be utilized as appropriate. FIG. 1, therefore, broadly illustrates how individual system elements may be implemented in a relatively separated or relatively more integrated manner.

The computer system 100 is shown comprising hardware elements that can be electrically coupled via a bus 105 (or may otherwise be in communication, as appropriate). The hardware elements can include one or more processors 110, including without limitation, one or more general purpose processors and/or one or more special purpose processors (such as digital signal processing chips, graphics acceleration chips, and/or the like); one or more input devices 115, which can include without limitation a mouse, a keyboard and/or the like; and one or more output devices 120, which can include without limitation a display device, a printer and/or the like.

The computer system 100 may further include (and/or be in communication with) one or more storage devices 125, which can comprise, without limitation, local and/or network accessible storage and/or can include, without limitation, a disk drive, a drive array, an optical storage device, a solid state storage device such as a random access memory ("RAM") and/or a read-only memory ("ROM"), which can be programmable, flash updateable and/or the like. The computer system 100 might also include a communications subsystem 130, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 130 may permit data to be exchanged with a network (such as the network described below, to name one example), and/or any other devices described herein. In many embodiments, the computer system 100 will further comprise a working memory 135, which can include a RAM or ROM device, as described above.

The computer system 100 also can comprise software elements, shown as being currently located within the working memory 135, including an operating system 140 and/or other code, such as one or more application programs 145, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 125 described above. In some cases, the storage medium might be incorporated within a computer system, such as the system 100. In other embodiments, the storage medium might be separate from a computer system (i.e., a removable medium, such as a compact disc, etc.), and is provided in an installation package, such that the storage medium can be used to program a general purpose computer with the instructions/code stored thereon. These instructions might take the form of executable code, which is executable by the computer system 100 and/or might take the form of source and/or installable code, which, upon compilation and/or installation on the computer system 100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 100) to perform methods of the invention. According to a set of embodiments, some or all of the procedures of such methods are performed by the computer system 100 in response to processor 110 executing one or more sequences of one or more instructions (which might be incorporated into the operating system 140 and/or other code, such as an application program 145) contained in the working memory 135. Such instructions may be read into the working memory 135 from another machine-readable medium, such as one or more of the storage device(s) 125. Merely by way of example, execution of the sequences of instructions contained in the working memory 135 might cause the processor(s) 110 to perform one or more procedures of the methods described herein.

The terms "machine-readable medium" and "computer readable medium," as used herein, refer to any medium that participates in providing data that causes a machine to operate in a specific fashion. In an embodiment implemented using the computer system 100, various machine-readable media might be involved in providing instructions/code to processor(s) 110 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 125. Volatile media includes, without limitation, dynamic memory, such as the working memory 135. Transmission media includes coaxial cables, copper wire and fiber optics, including the wires that comprise the bus 105, as well as the various components of the communications subsystem 130 (and/or the media by which the communications subsystem 130 provides communication with other devices). Hence, transmission media can also take the form of waves (including without limitation radio, acoustic and/or light waves, such as those generated during radio wave and infrared data communications).

Common forms of physical and/or tangible computer-readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 130 (and/or components thereof) generally will receive the signals, and the bus 105 then might carry the signals (and/or the data, instructions, etc., carried by the signals) to the working memory 135, from which the processor(s) 110 retrieves and executes the instructions. The instructions received by the working memory 135 may optionally be stored on a storage device 125 either before or after execution by the processor(s) 110.

Figure 2:
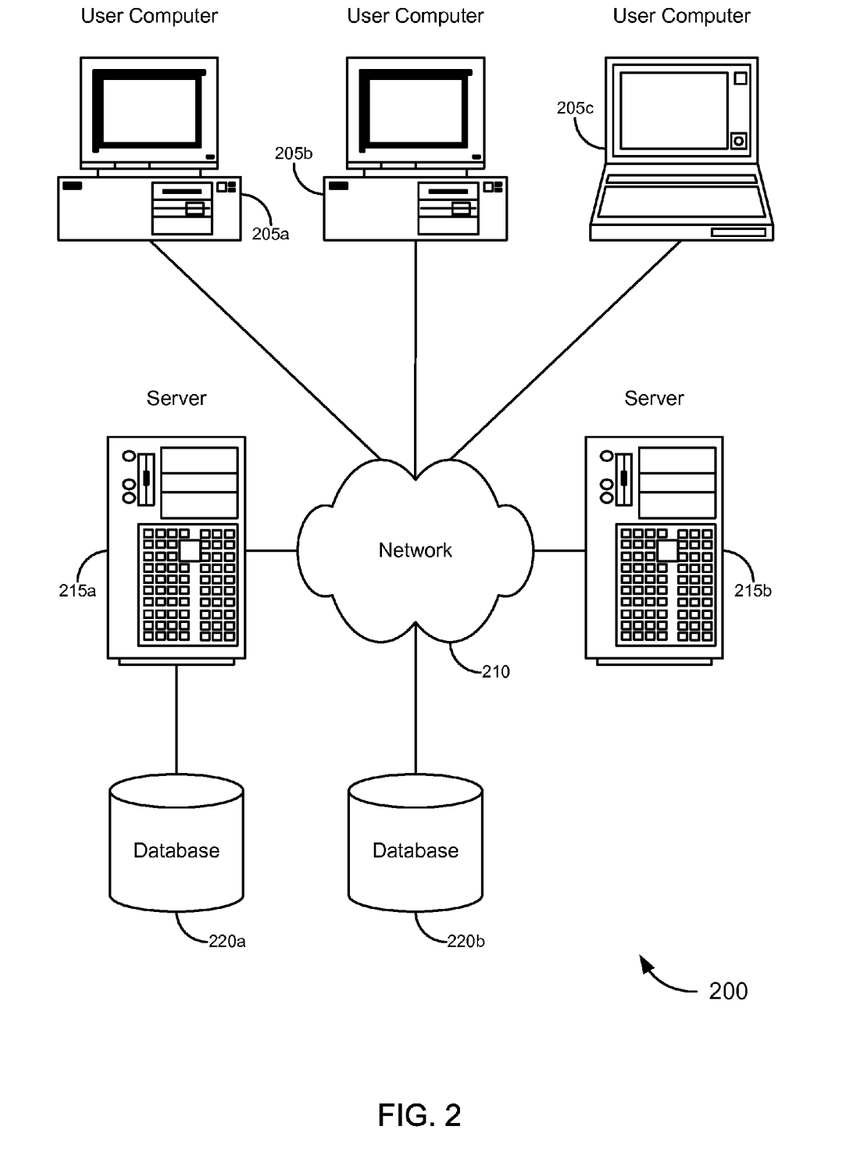
FIG. 2 is a block diagram illustrating a networked system of computers, which can be used in accordance with various embodiments of the present invention.

Merely by way of example, FIG. 2 illustrates a schematic diagram of a system 200 that can be used in accordance with one set of embodiments. The system 200 can include one or more user computers 205. The user computers 205 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user computers 205 can also have any of a variety of applications, including one or more applications configured to perform methods of the invention, as well as one or more office applications, database client and/or server applications, and web browser applications. Alternatively, the user computers 205 can be any other electronic device, such as a thin-client computer, Internet-enabled mobile telephone, and/or personal digital assistant (PDA), capable of communicating via a network (e.g., the network 210 described below) and/or displaying and navigating web pages or other types of electronic documents. Although the exemplary system 200 is shown with three user computers 205, any number of user computers can be supported.

Certain embodiments of the invention operate in a networked environment, which can include a network 210. The network 210 can be any type of network familiar to those skilled in the art that can support data communications using any of a variety of commercially available protocols, including without limitation TCP/IP, SNA, IPX, AppleTalk, and the like. Merely by way of example, the network 210 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infrared network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 215. Each of the server computers 215 may be configured with an operating system, including without limitation any of those discussed above, as well as any commercially (or freely) available server operating systems. Each of the servers 215 may also be running one or more applications, which can be configured to provide services to one or more clients 205 and/or other servers 215.

Merely by way of example, one of the servers 215 may be a web server, which can be used, merely by way of example, to process requests for web pages or other electronic documents from user computers 205. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 205 to perform methods of the invention.

The server computers 215, in some embodiments, might include one or more host servers, which can include one or more applications accessible by a client running on one or more of the client computers 205 and/or other servers 215.

Merely by way of example, the server(s) 215 can be one or more general purpose computers capable of executing programs or scripts in response to the user computers 205 and/or other servers 215, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The host server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 205 and/or another server 215. In some embodiments, an host server can create web pages dynamically for displaying the information in accordance with embodiments of the invention. Data provided by an host server may be formatted as web pages (comprising HTML, Javascript, etc., for example) and/or may be forwarded to a user computer 205 via a web server (as described above, for example). Similarly, a web server might receive web page requests and/or input data from a user computer 205 and/or forward the web page requests and/or input data to an host server. In some cases a web server may be integrated with an host server.

In accordance with further embodiments, one or more servers 215 can function as a file server and/or can include one or more of the files (e.g., application code, data files, etc.) necessary to implement methods of the invention incorporated by an application running on a user computer 205 and/or another server 215. Alternatively, as those skilled in the art will appreciate, a file server can include all necessary files, allowing such an application to be invoked remotely by a user computer 205 and/or server 215. It should be noted that the functions described with respect to various servers herein (e.g., host server, database server, web server, file server, etc.) can be performed by a single server and/or a plurality of specialized servers, depending on implementation-specific needs and parameters.

In certain embodiments, the system can include one or more databases 220. The location of the database(s) 220 is discretionary. Merely by way of example, a database 220a might reside on a storage medium local to (and/or resident in) a server 215a (and/or a user computer 205). Alternatively, a database 220b can be remote from any or all of the computers 205, 215, so long as the database can be in communication (e.g., via the network 210) with one or more of these. In a particular set of embodiments, a database 220 can reside in a storage-area network ("SAN") familiar to those skilled in the art. (Likewise, any necessary files for performing the functions attributed to the computers 205, 215 can be stored locally on the respective computer and/or remotely, as appropriate.) In one set of embodiments, the database 220 can be a relational database, such as an Oracle™ database, that is adapted to store, update, and retrieve data in response to SQL-formatted commands. The database might be controlled and/or maintained by a database server, as described above, for example.

Figure 3:
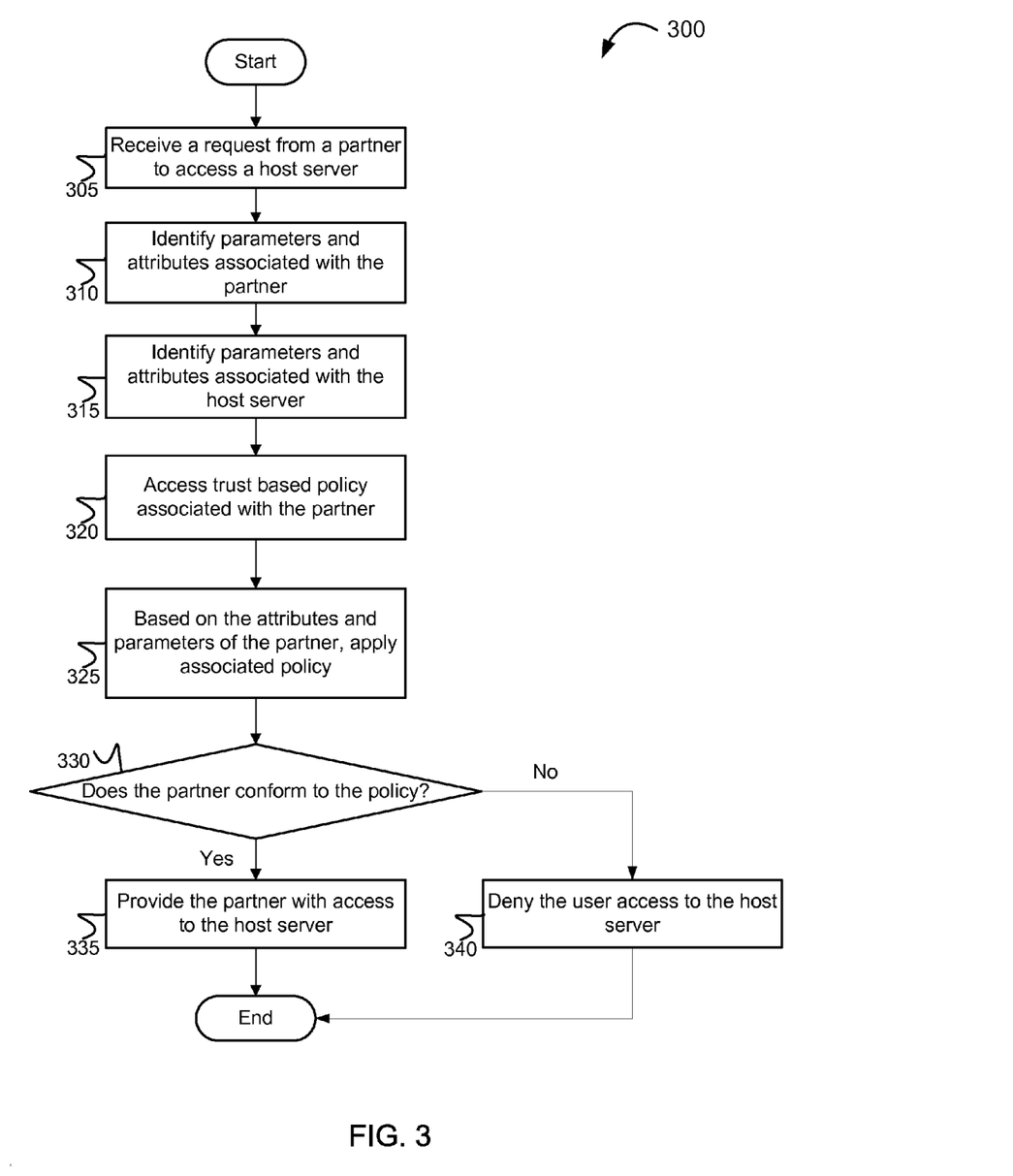
FIG. 3 is a flow diagram illustrating a method of implementing policy based trust management, in accordance with one embodiment of the present invention.

Turning now to FIG. 3, which illustrates a method 300 of implementing policy based trust management. At process block 305, a trust request from a partner for accessing a host server. In one embodiment, the host server may be a web server, a mail server, a file server, etc. The trust request may also include information and attributes identifying the partner making the trust request. For example, the partner system's MAC address, the partner system's IP address, the last time the partner system made a trust request to the host server, the partner's username and password, etc. may be included with the trust request.

Alternatively, there may not be a separate trust request happening. This may happen as part of the request partner sending in a secure and encrypted manner to a trusted server. Details are presented in an encrypted format using a shared key and yet there is a possibility that the access is denied if the trust policy have not been met.

At process block 310, parameters and attributes associated with the partner are identified. Some additional information about the partner system and/or the partner may be gathered from a partner database, or the like. In addition, at process block 315, attributes and/or parameters associated with the host server may be identified. For example, access restrictions, partner account restrictions, hardware equipment, etc. may be identified that are associated with the host server.

Further, at process block 320, a trust policy database may be accessed to determine the policies associated with the partner. The policies may include trust based attributes and parameters associated with accessing the partner. For example, the policies may restrict access to the host server based on the partner system's IP or MAC address, the specifications of the partner system, the partner account attributes, etc. Furthermore, the policies may restrict the way in which the partner intends to utilize the host server. Accordingly, the trust policies may enforce varying levels of trust in partners.

At process block 325, based on the attributes and parameters of the partner, the associated polices are applied to the trust request. Hence, the partner is granted a level of trust, and a duration of trust, such that the partner is trusted for specific activities, specific resources (criteria-based trust), and for a specified amount of time (time-based trust), etc. to the host server.

Further, at decision block 330, a determination is made whether the trust request conforms with the associated policies. If the trust request does conform with the associated policies then, at process block 335, the partner is provided with access (in accordance with the restrictions associated with the policies) to the host server. Alternatively, if the trust request fails to comply with the associated trust policies (in whole or in part), then at process block 340, the partner would be restricted access to the host server. Hence, accordingly aspects of the present invention provide for managed trust which avoids indefinite and open-ended trust relationships, which provide for a more secure and managed trust environment.

Figure 4:
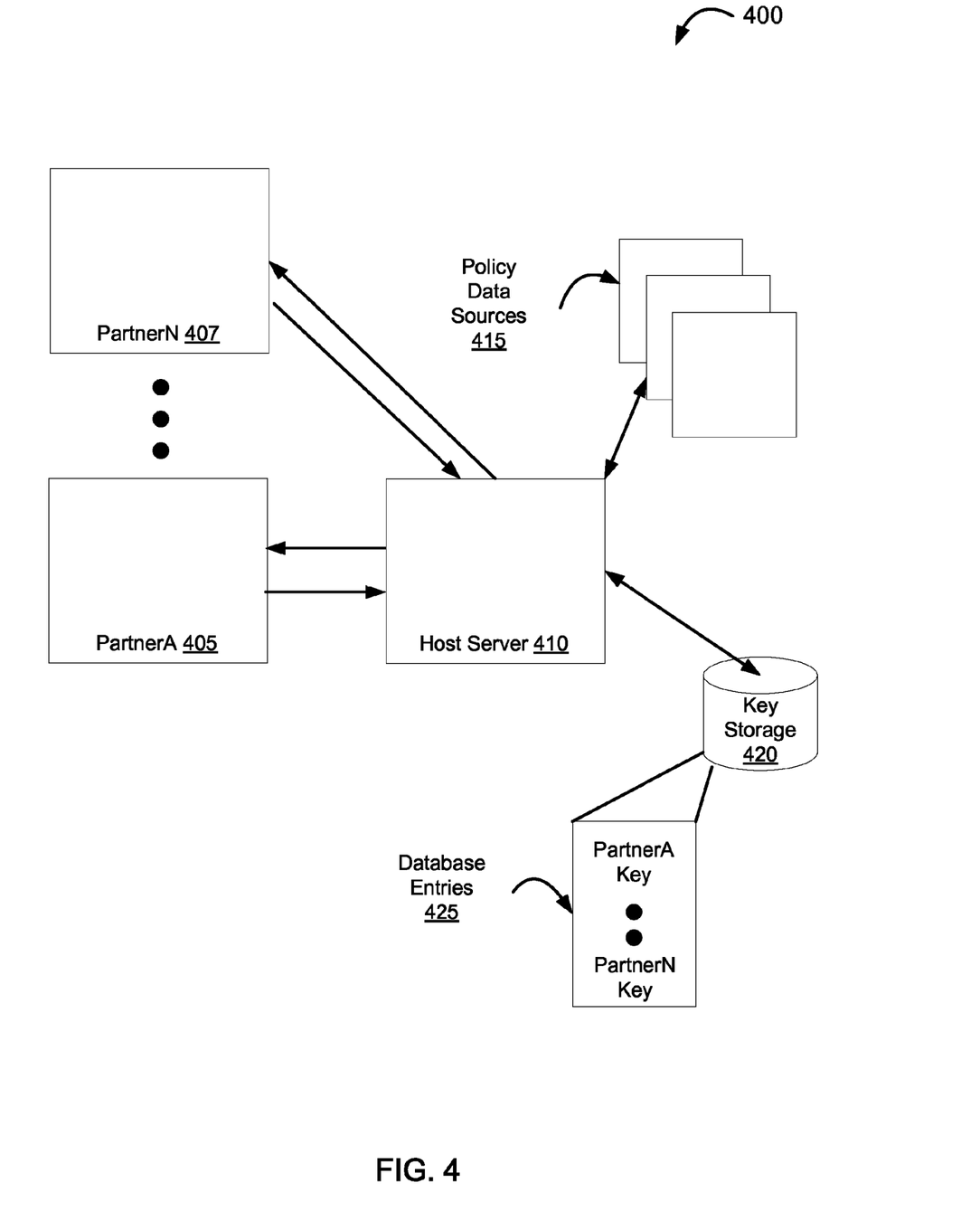
FIG. 4 is a block diagram illustrating a system for implementing policy based trust management, in accordance with one embodiment of the present invention.

FIG. 4 is a block diagram illustrating a system 400 for implementing policy based trust management, in accordance with one embodiment of the present invention. In one embodiment, system 400 may include a PartnerA 405, or any number of PartnerN 407 partner systems. PartnerA 405 may send a trust request to host server 410, then host server 410 accesses key storage 420. In key storage 420, database entries 425 are searched to determine is a PartnerA key is located within the key storage 420.

If a PartnerA key existed, then the information in the key is compared with the policy data sources 415 policy which corresponds to PartnerA 405. If partenerA 405 is in compliance with the policy, then PartnerA 405 is granted access to host server 410, otherwise access is denied. Furthermore, if the retrieved key for PartnerA 405 is expired or no longer valid, then the key may be removed from database entries 425.

Figure 5:
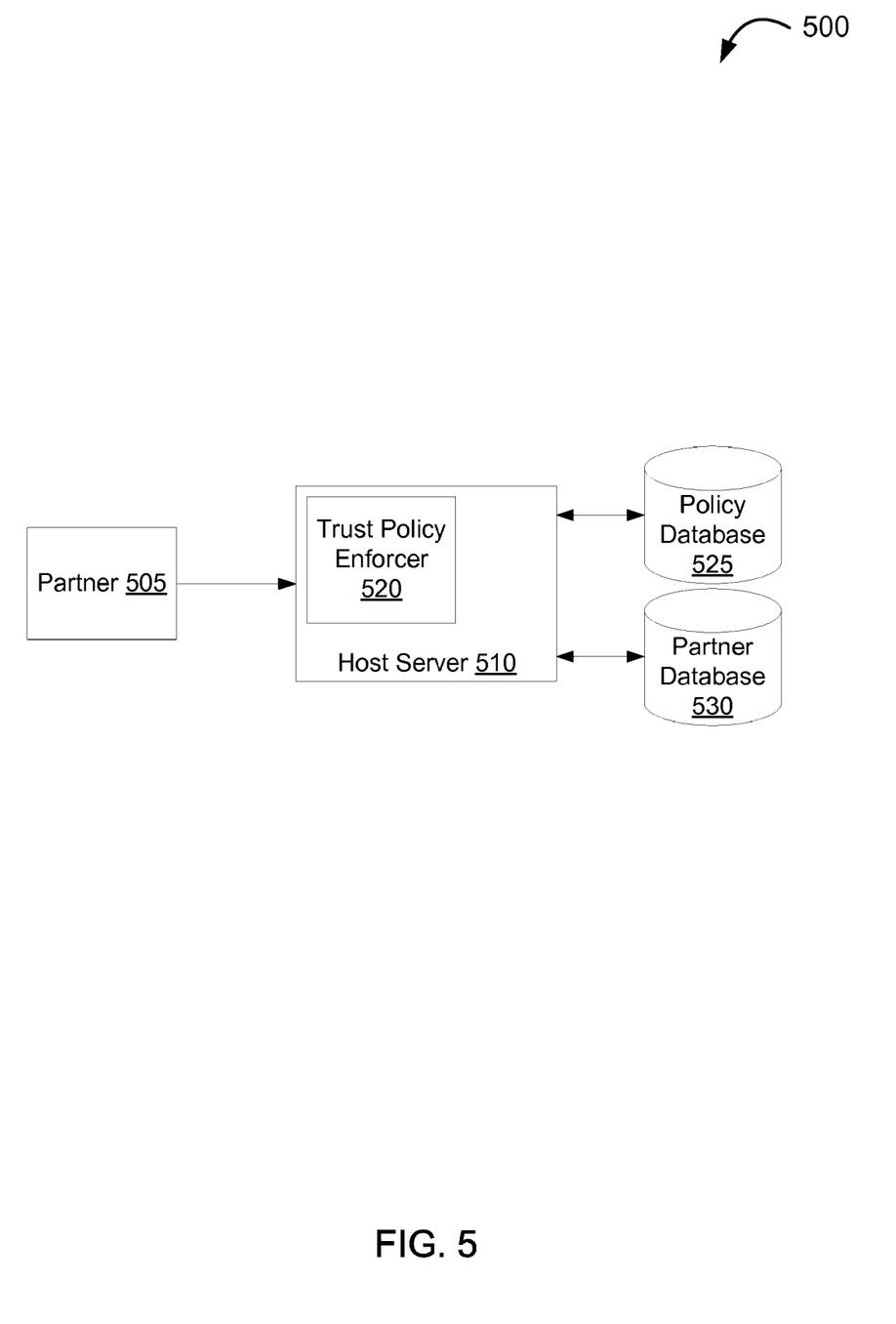
FIG. 5 is a block diagram further illustrating a system for implementing policy based trust management, in accordance with one embodiment of the present invention.

Now turning to FIG. 5, which illustrates a system 500 for implementing policy based trust management. System 500 may include a partner system 505 which sends a trust request for access to a host server 510. Host server 510 includes a trust policy enforcer 520, which is configured to enforce the policies stored in policy database 525 which are associated with partner system 505. Furthermore, system 500 includes a partner database 530 which includes partner account information used to determine whether partner system 505's trust request complies with the policies associated with the partner system 505. As such, system 500 is configured to implement method 300 in FIG. 3.

In a further embodiment, host server 510 may be a single sign-on (SSO) server. Furthermore, an administrator may be provided with the ability to make changes and modifications to the trust policies and the way in which they enforce trust with regard to the partner system 505.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of implementing policy based trust management, the method comprising:
   receiving, at a host server, a trust request from a partner;
   identifying, at the host server via a trust policy enforcer, parameters and attributes associated with the partner, wherein the parameters for the partner include one or more of the following: duration of the partner's account, access level of the partner, trust level of the partner, application authorization list, or hardware access authorization list;
   accessing, by the trust policy enforcer, a policy database;
   retrieving, by the trust policy enforcer, one or more trust policies associated with the partner, wherein the one or more associated trust policies are each valid for a specific period of time and expire once the specific period of time lapses;
   determining if the one or more associated trust policies have expired;
   based on the attributes and parameters of the partner and the one or more associated trust policies being unexpired, applying, by the trust policy enforcer, the one or more associated trust policies to the request; and
   based on the attributes and the parameters of the partner conforming with requirements of the one or more trust policies and the one or more associated trust policies being unexpired, providing the partner with access to the host server.

2. The method of claim 1, wherein the host server comprises a single sign-on (SSO) server.

3. The method of claim 1, wherein the attributes of the partner include one or more of the following: access rights, IP address, and MAC address.

4. The method of claim 1, wherein the partner is attempting to access the host server using the partner's system.

5. The method of claim 4, wherein the partner system includes one or more of the following attributes: an IP address, a MAC address, a time zone indicator, and a hardware identifier.

6. The method of claim 1, wherein the parameters for the partner include one or more of the following: requesting IP address restrictions, requesting MAC address restrictions, time to live value, application usage restrictions, file usage restrictions, data usage restrictions, or partner account restrictions.

7. The method of claim 1, further comprising providing an administrator with access to the trust policy database and the trust policy enforcer.

8. The method of claim 7, further comprising receiving, from the administrator, modifications or updates to the trust policy database and/or the trust policy enforcer.

9. The method of claim 1, further comprising based on the partner failing to conform with the requirements of the one or more trust policies associated with the partner, denying the partner access to the host server.

10. The method of claim 1, wherein the partner has a login and a password.

11. The method of claim 10, wherein the login and password implement public key authentication.

12. The method of claim 11, further comprising providing, to the host server from the partner, a valid username and password combination.

13. The method of claim 12, further comprising denying the partner access to the host server even with the valid username and password combination for failing to conform with the one or more trust policies associated with the partner.

14. A system for implementing policy based trust management, the system comprising:
   a trust policy database configured to store a plurality of trust policies;
   a partner database configured to store partner account information;
   a host server coupled with the trust policy database and the partner database, the host server including a trust policy enforcer configured to receive a trust request from a partner, identify parameters and attributes associated with the partner by accessing the partner database, wherein the parameters for the partner include one or more of the following: requesting IP address restrictions, requesting MAC address restrictions, time to live value, application usage restrictions, file usage restrictions, data usage restrictions, or partner account restrictions, access the policy database and retrieve one or more trust policies associated with the partner, wherein the one or more associated trust policies are each valid for a specific period of time and expire once the specific period of time lapses, determine if the one or more associated trust policies have expired, based on the attributes and parameters of the partner and the one or more associated trust policies being unexpired, apply the one or more associated trust policies to the request, and based on conformity with the one or more trust policies and the one or more associated trust policies being unexpired, provide the partner with access to the host server.

15. The system of claim 14, wherein the host server comprises a single sign-on (SSO) server.

16. A non-transitory machine-readable medium having sets of instructions stored thereon for implementing policy based trust management, when executed by a machine, cause the machine to:

receive, at a host server, a trust request from a partner;

identify, at the host server via a trust policy enforcer, parameters and attributes associated with the partner, wherein the parameters for the partner include one or more of the following: requesting IP address restrictions, requesting MAC address restrictions, time to live value, application usage restrictions, file usage restrictions, data usage restrictions, or partner account restrictions;

access, by the trust policy enforcer, a policy database;

retrieve, by the trust policy enforcer, one or more trust policies associated with the partner, wherein the one or more associated trust policies are each valid for a specific period of time and expire once the specific period of time lapses;

determine if the one or more associated trust policies have expired;

based on the attributes and parameters of the partner and the one or more associated trust policies being unexpired, apply, by the trust policy enforcer, the one or more associated trust policies to the request; and based on conformity with the one or more trust policies and the one or more associated trust policies being unexpired, provide the partner with access to the host server.

17. The non-transitory machine-readable medium of claim 16, wherein the sets of instructions, when further executed by the machine, cause the machine to provide an administrator with access to the trust policy database and the trust policy enforcer.

18. The non-transitory machine-readable medium of claim 17, wherein the sets of instructions, when further executed by the machine, cause the machine to receive, from the administrator, modifications or updates to the trust policy database and/or the trust policy enforcer.

* * * * *

UNITED STATES PATENT AND TRADEMARK OFFICE
CERTIFICATE OF CORRECTION

PATENT NO. : 8,468,586 B2  
APPLICATION NO. : 12/611448  
DATED : June 18, 2013  
INVENTOR(S) : Koottayi et al.

Page 1 of 1

It is certified that error appears in the above-identified patent and that said Letters Patent is hereby corrected as shown below:

In the Specification:

In column 8, line 62, delete "partenerA" and insert -- partnerA --, therefor.

Signed and Sealed this
Eighth Day of October, 2013

Teresa Stanek Rea
*Deputy Director of the United States Patent and Trademark Office*